United States Patent
Goudes (10) Patent No.: US 6,185,917 B1
(45) Date of Patent: Feb. 13, 2001

(54) VERSATILE UTILITY CART

(76) Inventor: James Goudes, 800 Shoop Ave., Kannapolis, NC (US) 28081

( * ) Notice: Under 35 U.S.C. 154(b), the term of this patent shall be extended for 0 days.

(21) Appl. No.: 09/267,568

(22) Filed: Mar. 12, 1999

Related U.S. Application Data (60) Provisional application No. 60/099,035, filed on Sep. 3, 1998, and provisional application No. 60/077,701, filed on Mar. 12, 1998.

(51) Int. Cl.$^7$ ............................................ B62B 3/00
(52) U.S. Cl. .................................... 56/12.8; 56/16.7
(58) Field of Search ........................... 172/42, 245, 247; 56/12.8, 16.7, 16.9; 28/47.34, 47.35; 248/223.41, 225.11, 225.21

(56) References Cited

U.S. PATENT DOCUMENTS

| | | |
|---|---|---|
| 2,796,155 | 6/1957 | Cabler . |
| 2,867,449 * | 1/1959 | Shawver ........................... 280/47.34 |
| 2,876,484 * | 3/1959 | Wells .................................. 15/246.4 |
| 3,603,162 * | 9/1971 | Gohler ................................. 56/16.9 |
| 3,776,459 | 12/1973 | Bonvicini . |
| 3,862,469 | 1/1975 | Burgoon . |
| 4,033,098 * | 7/1977 | Green ................................... 56/17.5 |
| 4,076,460 | 2/1978 | Roof . |
| 4,118,826 | 10/1978 | Kaeser . |
| 4,428,183 * | 1/1984 | Lowry et al. ......................... 56/17.2 |
| 4,570,887 * | 2/1986 | Banister ......................... 248/223.41 |
| 4,597,203 * | 7/1986 | Middleton ............................ 172/247 |
| 4,650,200 * | 3/1987 | Berfield et al. .................... 280/47.34 |
| 5,090,088 | 2/1992 | Toth . |
| 5,119,619 | 6/1992 | Zappia . |
| 5,163,275 * | 11/1992 | Hare et al. .......................... 56/16.7 |
| 5,272,858 * | 12/1993 | Bonis ................................... 56/12.8 |
| 5,299,826 | 4/1994 | Flowers . |
| 5,474,312 * | 12/1995 | Starita et al. ..................... 280/47.35 |
| 5,520,253 * | 5/1996 | Kesting ................................ 172/42 |
| 5,580,028 * | 12/1996 | Tomczak et al. .................... 248/634 |
| 6,009,695 * | 1/2000 | Karas ................................... 56/16.7 |
| 6,027,128 * | 2/2000 | Stich et al. ....................... 280/47.35 |
| 6,050,069 * | 4/2000 | Elensky ................................ 56/16.7 |

* cited by examiner

Primary Examiner—Robert E. Pezzuto
Assistant Examiner—Nathan Mammen
(74) Attorney, Agent, or Firm—Christopher C. Dremann (57) ABSTRACT

A versatile, lightweight and compact utility cart is provided for supporting and transporting a variety of landscaping appliances. The utility cart includes a base defining a generally planar platform, a plurality of wheels rotatably mounted to the base and a handle extending upwardly from the base. The utility cart may also include a mounting arm extending outwardly from the base in the plane of the platform for adjustably mounting an accessory of the landscaping appliance. In one embodiment, the utility cart further includes a retaining arm pivotally mounted to the base and the retaining arm includes an adjustable retaining guide for temporarily retaining the landscaping appliance between the retaining arm and the platform. In a second embodiment, the utility cart further includes a mounting bracket having a U-shaped flange at one end and an L-shaped flange at the other end for temporarily securing the landscaping appliance to the platform. When the utility cart is utilized to support and transport a conventional hand-held leaf blower, the mounting bracket includes a plurality of vibration isolators for absorbing vertical shocks and forces transferred to the leaf blower and for diminishing the vibration transferred to the operator. The utility cart supports and transports a conventional hand-held leaf blower so that the leaf blower may be used over a large area or for an extended period of time and is readily converted to support and transport a garden caddy including a seat so that a user can work comfortably for extended periods of time.

6 Claims, 7 Drawing Sheets

VERSATILE UTILITY CART

CROSS REFERENCE TO RELATED APPLICATIONS

This application claims the benefit of U.S. Provisional Application No. 60/099,035, filed Sep. 3, 1998, and U.S. Provisional Application No. 60/077,701, filed Mar. 12, 1998.

BACKGROUND OF THE INVENTION

1. Field of the Invention

The invention relates generally to a cart, and more particularly, to a utility cart for supporting and transporting a conventional landscaping appliance, such as a hand-held leaf blower, garden caddy, wheelbarrow, dump bed, spreader or chemical dispenser.

A conventional hand-held leaf blower is economical and ideal for use in a confined area and for a limited period of time. However, when required to be used in a larger area or for an extended period of time, even a lightweight, hand-held leaf blower can become tiresome to hold and manipulate. Further it is difficult, if not impossible, to maintain the airflow from a hand-held leaf blower at a consistent level above the ground. Under these circumstances, it is desirable to utilize a leaf blower that is mounted on a moveable cart, similar to a snow blower.

A conventional garden caddy typically includes a hollow, interior compartment and a lid that also functions as a seat. Accordingly, a garden caddy is useful for storing gardening tools and supplies and for providing a sturdy seat to alleviate the stress of kneeling or standing while attending to low level vegetation. At times, the garden caddy is attached to a wheeled platform having a handle such that the gardening tools and supplies can be easily transported to and from the garden. In most cases, however, the garden caddy is permanently fixed to the platform. Thus, the garden caddy is not easily and readily removable so that the wheeled platform can be put to other uses when the garden caddy is not in use.

A conventional wheelbarrow and a conventional dump bed typically include an open cavity for temporarily supporting and transporting dirt, gardening tools and supplies, building materials, refuse and the like. Conventional wheelbarrows and dump beds, however, are inherently unstable and prone to tipping on uneven terrain. Accordingly, they are not well suited for supporting and transporting large, heavy or awkward landscaping appliances, such as hand-held and back-pack spreaders and chemical dispensers. As a result, many accidents occur each year from the misuse of conventional wheelbarrows and dump beds to support and transport such landscaping appliances.

2. Description of Related Art

Utility carts are well known for supporting and transporting conventional landscaping appliances between locations where the appliance is to be used. As previously mentioned, it is also known to mount a conventional garden caddy on a wheeled platform so that the garden caddy may be transported to a location where it is then supported on the platform at the location where it is to be used. Although known utility carts and wheeled platforms are suitable for these uses, none of the known carts are versatile enough to support and transport both a conventional hand-held leaf blower and a conventional garden caddy, as well as other conventional landscaping appliances.

U.S. Pat. No. 5,090,088 to Toth discloses a leaf blower mounted on a wheeled deck. The leaf blower includes an axial fan secured to the horizontally extending drive shaft of a motor mounted on the deck. Although the wheels are adjustable relative to the deck to allow for the height and angle of incline of the fan to be optimized, the location of the fan relative to the deck cannot be changed. Thus, the air stream from the fan is always in the same general direction relative to the deck. Further, existing leaf blowers mounted on carts are typically more expensive and are heavy, loud and difficult to store. The ideal solution to the aforementioned problems would be a hand-held leaf blower that is temporarily supported on a compact utility cart. Accordingly, the leaf blower could be removed for use in a confined area and for a limited period of time, or may be positioned on the utility cart for use in a larger area or for a longer period of time. Heretofore, however, no such lightweight, compact utility cart for temporarily supporting and transporting a hand-held leaf blower has been available.

When not employed to support and transport the hand-held leaf blower, it would be desirable if the utility cart were versatile enough to be suitable for other uses as well. For example, it would be desirable for the utility cart to support and transport a conventional garden caddy that combines an interior storage compartment for storing garden tools and supplies with a sturdy seat for alleviating the stress of working for extended periods of time in a flowerbed or garden near to the ground. Heretofore, however, no such versatile utility cart has been available.

U.S. Pat. No. 5,299,826 to Flowers discloses a multi-function cart. Although the cart is primarily for use as a mechanic's creeper or a wheeled drip pan, it is conceivable that the cart could be configured for use as a garden caddy. Unfortunately, the cart disclosed in the Flowers patent is not compact and easy to maneuver, nor can it be readily converted to temporarily support and transport a lightweight, hand-held leaf blower or other landscaping appliance, such as a hand-held or back-pack spreader or chemical dispenser. Similarly, U.S. Pat. No. 2,796,155 to Cabler discloses a three-wheeled cart for facilitating garden work. The cart includes a comfortable seat and a compartment for carrying tools or garden materials. However, the Cabler cart likewise cannot be readily converted to temporarily support and transport a hand-held leaf blower or other landscaping appliance, such as a hand-held or backpack spreader or chemical dispenser.

Accordingly, it is apparent that a need exists for a lightweight, compact utility cart for supporting and transporting a variety of landscaping appliances between locations where the appliance is to be used. In particular, it is apparent that a need exists for such a utility cart that can be easily and readily converted to temporarily support and transport a conventional hand-held leaf blower or a conventional garden caddy. It is further apparent that a need exists for a lightweight, compact utility cart for securely supporting and transporting a large, heavy or awkward landscaping appliance, such as a hand-held or back-pack spreader or chemical dispenser.

OBJECTS OF THE INVENTION

Therefore, it is a principle object of the invention to provide a versatile utility cart for supporting and transporting a variety of landscaping appliances between locations where the appliance is to be used.

It is another, and more particular, object of the invention to provide a versatile utility cart that can be easily and readily converted to temporarily support and transport a conventional hand-held leaf blower or a conventional garden caddy.

It is another object of the invention to provide a versatile utility cart for securely supporting and transporting a large, heavy or awkward landscaping appliance, such as a hand-held or back-pack spreader or chemical dispenser.

It is yet another object of the invention to provide a versatile utility cart for supporting and transporting a variety of landscaping appliances that is lightweight to combat fatigue during use, and that is compact for convenient storage.

SUMMARY OF THE INVENTION

The invention is a versatile utility cart for supporting and transporting a variety of landscaping appliances between locations where the appliance is to be used. In a first preferred embodiment, the utility cart of the invention can be easily and readily converted to temporarily support and transport a conventional hand-held leaf blower or a conventional garden caddy. In a second preferred embodiment, the utility cart temporarily supports and transports a conventional hand-held leaf blower or garden caddy, as well as a large, heavy or awkward landscaping appliance, such as a dump bed or hand-held or backpack spreader or chemical dispenser. Preferably, the utility cart is lightweight for maneuverability and to combat fatigue during use, and is compact for convenient storage.

The utility cart includes a base defining a generally planar platform. The platform is provided to support the landscaping appliance as it is transported and during use. A plurality, and preferable at least three, wheels are rotatably mounted to the base or an extension thereof. The wheels permit the user of the utility cart to easily and smoothly transport the landscaping appliance over the ground. In the first preferred embodiment, the utility cart further includes a generally U-shaped retaining arm. The retaining arm is pivotally mounted to opposite sides of the base and extends upwardly from the platform. Preferably, the retaining arm includes means for temporarily retaining the landscaping appliance between the retaining arm and the platform of the base. The temporary retaining means is preferably an adjustable threaded shaft having a retaining guide at one end for receiving a portion of the landscaping appliance, for example the handle, therein.

The first preferred embodiment of the utility cart further includes a generally U-shaped handle that is rigidly attached to the retaining arm and extends rearwardly from the retaining arm and upwardly from the base. Preferably, the handle is removably attached to the retaining arm so that it may be easily separated from the remainder of the utility cart for convenient storage. Further, the handle preferably includes means for adjusting the distance between the portion of the handle that is grasped by the user and the retaining arm.

The utility cart further includes a generally U-shaped mounting arm for mounting an accessory of the landscaping appliance adjacent the base. The mounting arm includes means for adjustably positioning the accessory of the landscaping appliance at a desired location on the mounting arm. Preferably, the adjustable mounting means is a clamp having a pair of opposed, internally threaded holes for engaging an externally threaded thumbscrew. Accordingly, the clamp can be tightened and loosened to alternatively engage and disengage, respectively, the mounting arm. Thus, the accessory of the landscaping appliance can be secured at any predetermined location and orientation on the mounting arm relative to the landscaping appliance.

In particular, the utility cart is used to support and transport a conventional hand-held leaf blower so that the leaf blower can be operated over a large area or for an extended period of time without unduly tiring the operator. When not being used in conjunction with the hand-held leaf blower, the utility cart may be utilized to support and transport a conventional garden caddy for working in a flowerbed or garden near to the ground so that the operator is seated in a comfortable and convenient position. When not in use, the landscaping appliance and the handle of the utility cart can be removed for convenient storage. Thus, the invention provides a versatile, compact utility cart for supporting and transporting a variety of landscaping appliances between locations where the landscaping appliance is to be used.

In the second preferred embodiment of the invention, the platform defined by the base includes means for temporarily securing the landscaping appliance to the base of the utility cart. Preferably, the temporary securing means includes an elongate slot formed in one end of the platform defined by the base and an internally threaded hole provided in the opposite end of the platform for engaging an externally threaded thumbscrew. The landscaping appliance is preferably provided with a mounting bracket for cooperating with the means for temporarily securing the landscaping appliance to the base of the utility cart. The mounting bracket may be integrally formed with the landscaping appliance or may be removably secured thereto for a purpose to be described hereinafter. Preferably, the mounting bracket of the landscaping appliance includes a U-shaped flange at one end for engaging the slot formed in the platform of the base and an L-shaped flange at the opposite end having a recess for cooperating with the thumbscrew of the temporary securing means.

In the second preferred embodiment, the handle and the mounting arm are integrally formed and fixed to the base by attachment means. Preferably, the attachment means includes a plurality of adjustable, clamshell railing mounts secured to the base by suitable fasteners. The handle of the second preferred embodiment further includes a pair of opposed handwheels that may be loosened in a known manner to permit the upper portion of the handle to be rotated about a pivot axis and folded downwardly for convenient storage of the utility cart. Thus, the invention provides a versatile, compact utility cart for supporting and transporting a variety of landscaping appliances between locations where the landscaping appliance is to be used.

BRIEF DESCRIPTION OF THE DRAWINGS

In view of the aforementioned objects, and others which will become more readily apparent as the nature of the invention is better understood, the invention consists in the novel combination and arrangement of parts hereinafter more fully described, illustrated and claimed with reference being made to the attached drawings in which:

DETAILED DESCRIPTION OF THE PREFERRED EMBODIMENTS

In the following description, like reference numerals designate like or corresponding parts throughout the several figures. It is to be also understood that such terms as "front", "rear", "side", "up" and "down" are used for purposes of locating one element relative to another and are not to be construed as limiting terms. Further, it should be understood that the figures are for the purpose of describing preferred embodiments of the invention, and thus are not intended to limit the invention in any manner. A commercial embodiment of the invention developed by the inventor is to be sold under the trademark BLOWER BUGGY™.

Figure 1:
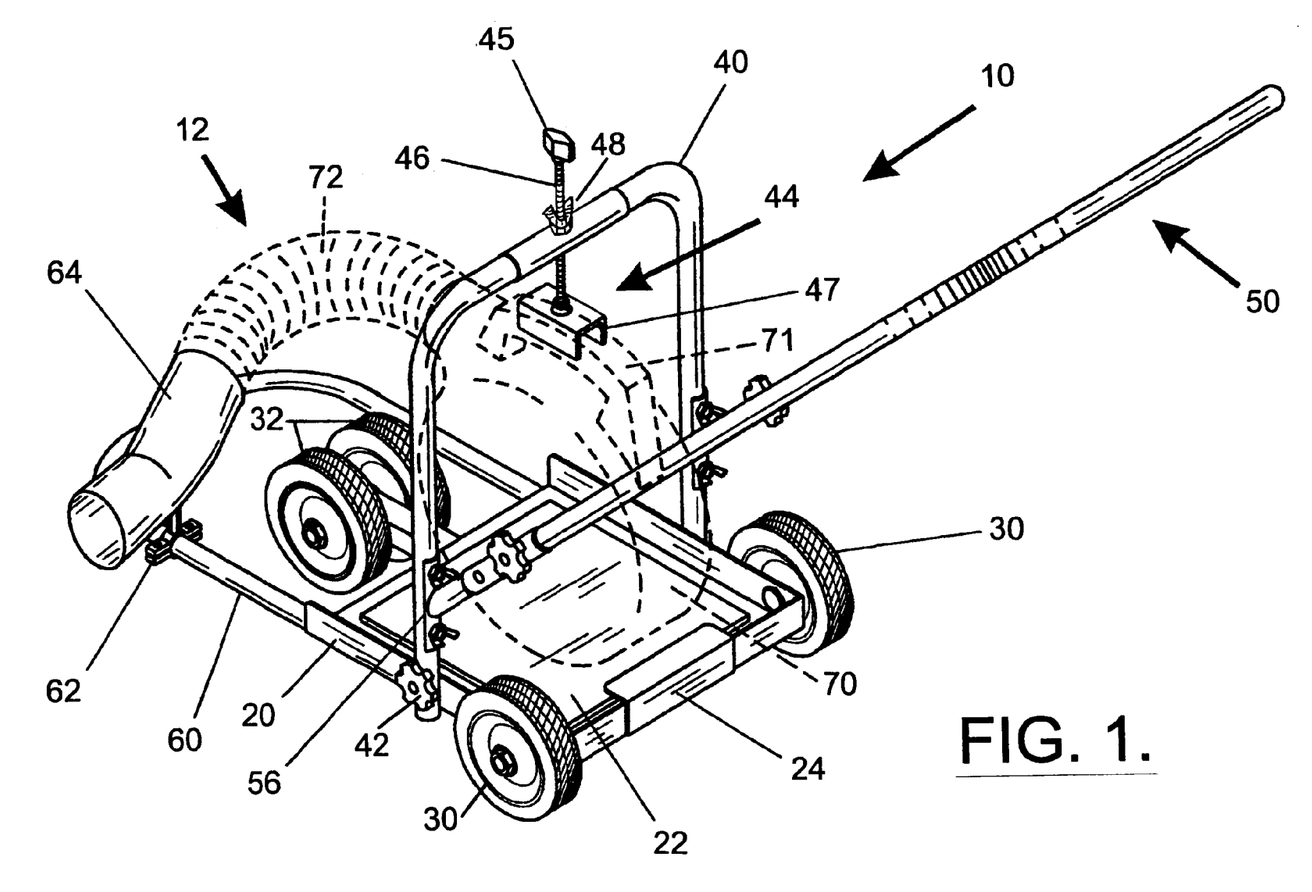
FIG. 1 is a perspective view of a first preferred embodiment of a utility cart according to the invention for supporting and transporting a landscaping appliance between locations where the landscaping appliance is to be used.

Referring now to the drawings, FIG. 1 is a perspective view of a first preferred embodiment of a utility cart, indicated generally at 10, for supporting and transporting a landscaping appliance, indicated generally at 12, between locations where the landscaping appliance is to be used. The landscaping appliance 12 may be any conventional lawn or garden tool, such as a hand-held or back-pack leaf blower, garden caddy, wheelbarrow, dump bed, spreader or chemical dispenser. For purposes of illustration only, the landscaping appliance 12 indicated by the broken lines in FIG. 1 is a conventional hand-held leaf blower.

The utility cart 10 is easily and readily converted for use with a variety of landscaping appliances 12. In particular, the utility cart 10 is designed to support and transport a conventional hand-held leaf blower and a conventional garden caddy, as will be described in greater detail hereinafter. In addition, the utility cart 10 is made of lightweight materials, such as aluminum or plastic, for maneuverability and to combat fatigue during use. Further still, the utility cart 10 is compact for convenient storage. The utility cart 10 comprises a generally rectangular base 20, a plurality of wheels 30, 32 rotatably mounted to the base or to an extension thereof, a retaining arm 40 pivotally mounted to the base and a handle 50 rigidly fixed to the retaining arm. Preferably, the utility cart 10 further comprises a mounting arm 60 adjacent the front of the base 20 for adjustably mounting an accessory of the landscaping appliance 12 to the base of the utility cart, as will be described hereinafter.

As best shown in FIG. 1, the base 20 of the utility cart 10 defines a generally planar platform 22 for supporting the landscaping appliance 12 thereon during transportation and use. Preferably, the platform 22 comprises a thin rubber pad on the upper surface for absorbing vertical shocks and forces so that the landscaping appliance 12 is cushioned as it is transported over rough or uneven terrain. When the utility cart 10 is utilized to support and transport a hand-held leaf blower, the rubber pad serves to protect the delicate electrical and mechanical components of the leaf blower and to diminish the amount of vibration transferred to the operator through the retaining arm 40 and the handle 50, and thereby further reduce the possibility of fatigue or injury. The base 20 is closed at the rear and sides by an upwardly extending flange, and the rear of the base is provided with an L-shaped angle bracket 24, for a purpose to be described hereinafter.

A plurality, and preferably at least three, wheels 30, 32 are rotatably mounted to the base 20 so that the utility cart 10 may be easily moved over uneven terrain. The wheels 30, 32 may be made of any suitable material, but preferably are made of hard plastic or vulcanized rubber. Preferably, a pair of rear wheels 30 are rotatably mounted adjacent the rear of the base 20 on short axles extending outwardly from opposite sides of the base in the plane of the platform 22. A pair of front wheels 32 may be rotatably mounted to the base 20 on opposite sides adjacent the front of the base in a like manner. However, as shown, the pair of front wheels 32 are preferably rotatably mounted on the ends of a short transverse axle which is fixed to an extension bar extending outwardly from the medial portion of the front of the base 20 in the plane of the platform 22. Alternatively, a single front wheel may be rotatably mounted on the transverse axle secured to the extension bar. As shown, the wheels 30, 32 are relatively small in diameter so that the landscaping appliance 12 is situated near the ground. However, the wheels 30, 32 may be any diameter and may be located anywhere on the utility cart 10 relative to the base 20 so long as the utility cart remains lightweight and compact.

Figure 2:
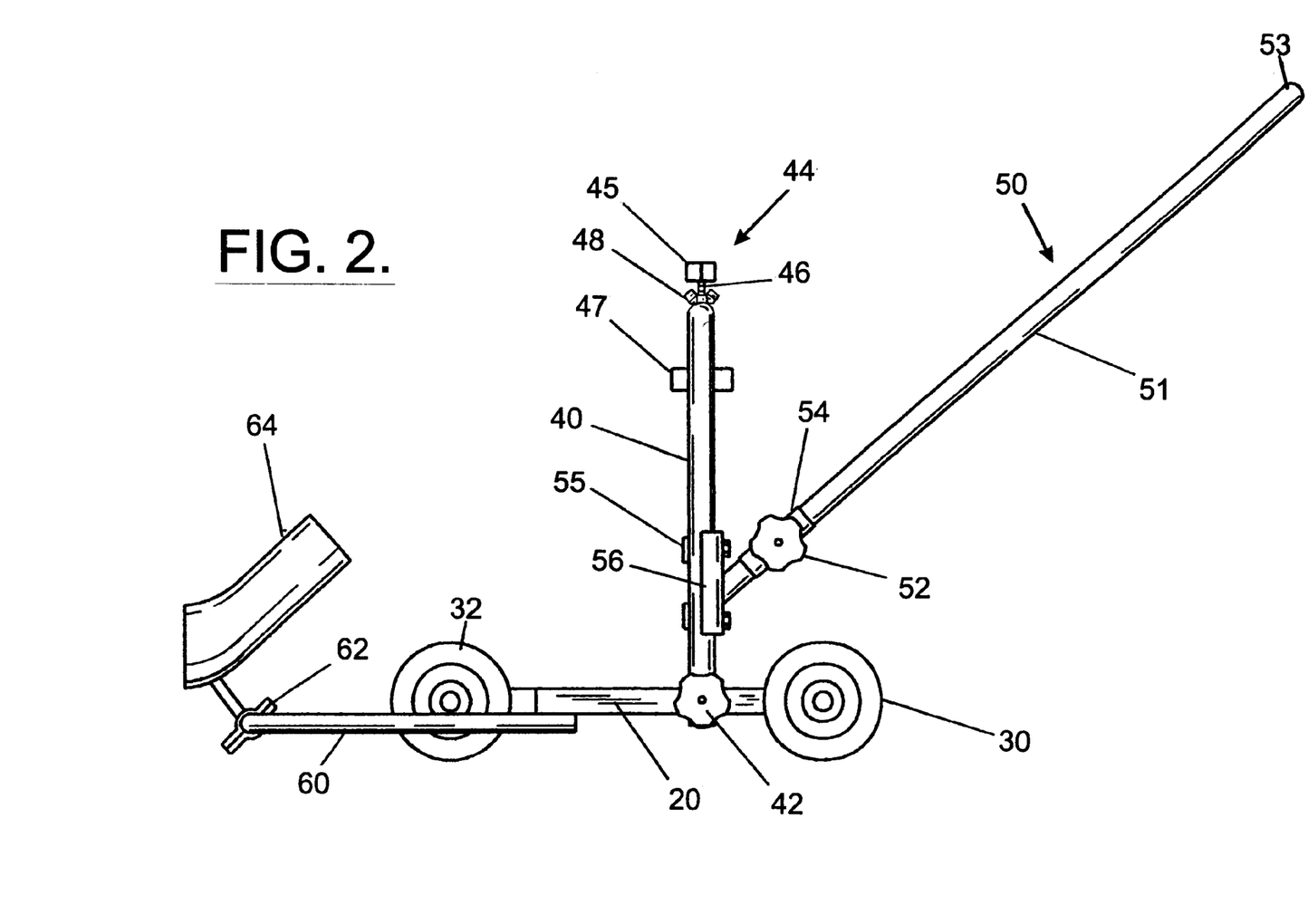
FIG. 2 is a side elevation view of the utility cart of FIG. 1.

As best shown in FIG. 2, the retaining arm 40 is pivotally mounted to the base 20 on a pair of threaded shafts extending outwardly from opposite sides of the base in the plane of the platform 22. Preferably, internally threaded handwheels 42 are provided for engaging the externally threaded shafts. Accordingly, the retaining arm 40 may be temporarily locked in position by tightening the handwheels 42 on opposite sides of the base 20 so that the retaining arm is held securely against the sides of the base. The handwheels 42 may be alternately loosened and tightened to reposition the retaining arm 40 at other angles relative to the base 20. The retaining arm 40 is generally U-shaped so as to retain the landscaping appliance 12 between the retaining arm and the platform 22 of the base 20. Preferably, the retaining arm 40 comprises means 44 for temporarily retaining the landscaping appliance 12 on the base 20 between the retaining arm and the platform 22. As shown, temporary retaining means 44 comprises an externally threaded shaft 46 positioned in an internally threaded hole provided in the uppermost portion of the retaining arm 40. The lower end of the shaft 46 is provided with a U-shaped retaining guide 47 (FIG. 1) mounted on a universal ball joint. The upper end of the shaft 46 is provided with a thumbscrew 45 for threading the shaft 46 through the retaining arm 40. A wing nut 48 is threaded on the shaft 46 between the retaining arm 40 and the thumbscrew 45 to arrest the vertical movement of the shaft 46 once the retaining guide 47 is securely positioned over the landscaping appliance 12.

The handle 50 is generally U-shaped and comprises a pair of arms 51 depending downwardly from an uppermost grasping portion 53 (FIG. 2). Each arm 51 of the handle 50 terminates in a semi-circular bracket 56 that is rigidly attached to the retaining arm 40 by fasteners 55. Thus, the position of the handle 50 relative to the retaining arm 40 is fixed as the retaining arm is pivoted about the base 20. Preferably, the handle 50 further comprises a pair of clam-shell brackets 54 and internally threaded handwheels 52 for adjusting the distance between the retaining arm 40 and the grasping portion 53. A pair of through holes formed in each bracket 54 cooperate with a series of corresponding holes formed in the arm 51 of the handle 50. A pair of threaded studs are then aligned with the holes of the bracket 54 and the selected hole of the arm 51 to receive the handwheel 52 thereon. Thus, the grasping portion 53 of the handle 50 is positioned at the desired distance from the retaining arm 40. The handle 50 may also be separated from the remainder of the utility cart 10 for convenient storage when not in use.

Preferably, the utility cart 10 further comprises a generally U-shaped mounting arm 60 for mounting an accessory of the landscaping appliance 12 adjacent the base 20 of the utility cart 10. The mounting arm 60 comprises means 62 for adjustably mounting a discharge and receiving chute 64 at any location on the mounting arm through an angle of about 180 degrees. The adjustable mounting means 62 is preferably a clamp that can be tightened and loosened to alternatively engage and disengage, respectively, the mounting arm 60. Thus, the discharge and receiving chute 64 may be readily positioned at any predetermined location on the mounting arm 60 relative to the base 20 of the utility cart 10. Additionally, the discharge and receiving chute 64 may be readily pivoted about an axis in the plane of the platform 22 of the base 20. Accordingly, the inclination and direction of the air stream from a conventional leaf blower can be adjusted to a predetermined orientation relative to the direction of travel of the utility cart 10.

As illustrated in FIG. 1, the utility cart 10 is particularly well suited for supporting and transporting a conventional hand-held leaf blower 70. The leaf blower 70 is positioned on the platform 22 of the base 20 and the retaining arm 40 is pivoted into position such that the retaining guide 47 of temporary retaining means 44 cradles the handle 71 of the leaf blower. Thumbscrew 45 is then tightened until the leaf blower 70 is securely retained between the retaining guide 47 and the platform 22. The threaded shaft 46 is then locked in position by tightening the wing nut 48 against the upper surface of the retaining arm 40. The rigid exhaust chute of the leaf blower 70 is replaced by a flexible conduit 72 so that the exhaust outlet of the leaf blower is in fluid communication with the discharge and receiving chute 64 on the mounting arm 60. The adjustment means 62 is then utilized to position the discharge and receiving chute 64 on the mounting arm 60 in a predetermined location and orientation relative to the exhaust outlet of the leaf blower 70. The flexible conduit 72 may be removably connected to the discharge and receiving chute 64 at one end and to the exhaust outlet of the leaf blower 70 at the other end by a hose clamp (not shown) having a thumbscrew or other convenient means for rapidly connecting and removing the flexible conduit. In this preferred embodiment, the utility cart 10 supports and transports the leaf blower 70 so that a user can operator the leaf blower over a large area or for an extended period of time without tiring.

Figure 3:
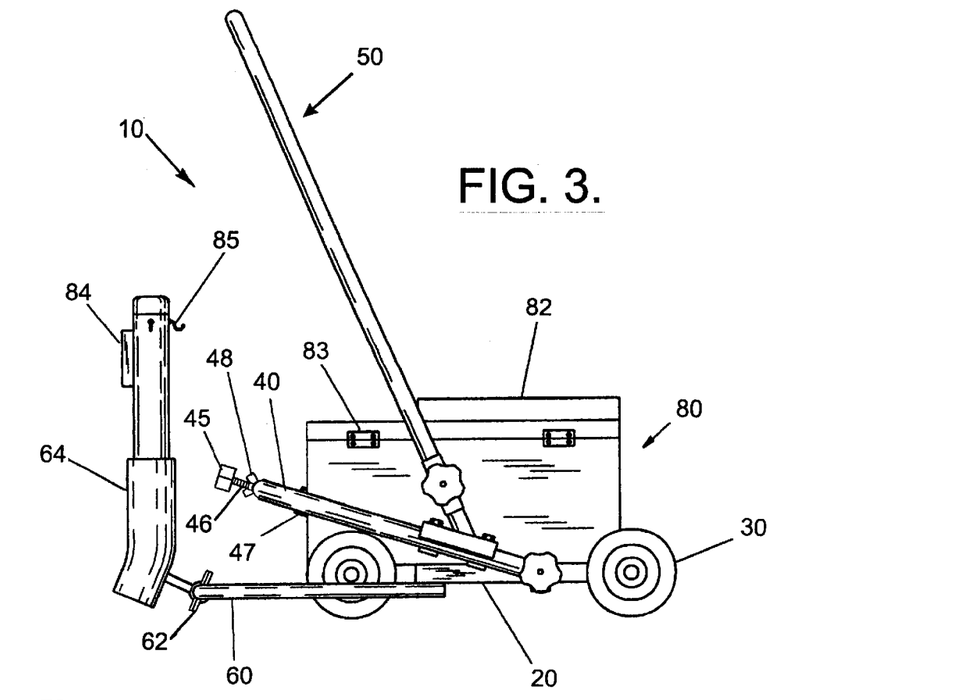
FIG. 3 is a side elevation view of the utility cart of FIG. 1 supporting a conventional garden caddy thereon.

As illustrated in FIG. 3, the utility cart 10 is also particularly well suited for supporting and transporting a conventional garden caddy 80. The garden caddy 80 is positioned on the platform 22 and the retaining arm 40 is pivoted relative to the base 20 in the direction of the mounting arm 60. Preferably, the garden caddy 80 has an elongate slot (not shown) formed in an end wall for receiving the L-shaped angle bracket 24 (FIG. 1) therein. Preferably, the garden caddy 80 also has a pair of spaced apart slots (not shown) formed in the opposite end wall for receiving the U-shaped retaining guide 47 of the temporary retaining means 44 therein. The thumbscrew 45 is tightened until the retaining guide 47 is secured within the spaced apart slots and the garden caddy 80 is anchored to the utility cart 10 between the retaining arm 40 and the angle bracket 24. The wing nut 48 is then tightened against the retaining arm 40 to lock the threaded shaft 46 in position. Preferably, the garden caddy 80 comprises a comfortable seat 82 that is connected to the body of the garden caddy by hinges 83. Accordingly, the seat 82 may be raised so that small garden tools and supplies may be stored in the interior storage compartment defined by the hollow body of the garden caddy 80. As shown, the discharge and receiving chute 64 of the mounting arm 60 may be oriented vertically to receive an additional storage compartment and tool hanger 84 having external hooks 85 thereon for hanging garden tools. In this preferred embodiment, the utility cart 10 supports and transports a garden caddy 80 so that the user can work comfortably for extended periods of time in a flowerbed or garden near to the ground.

Figure 4:
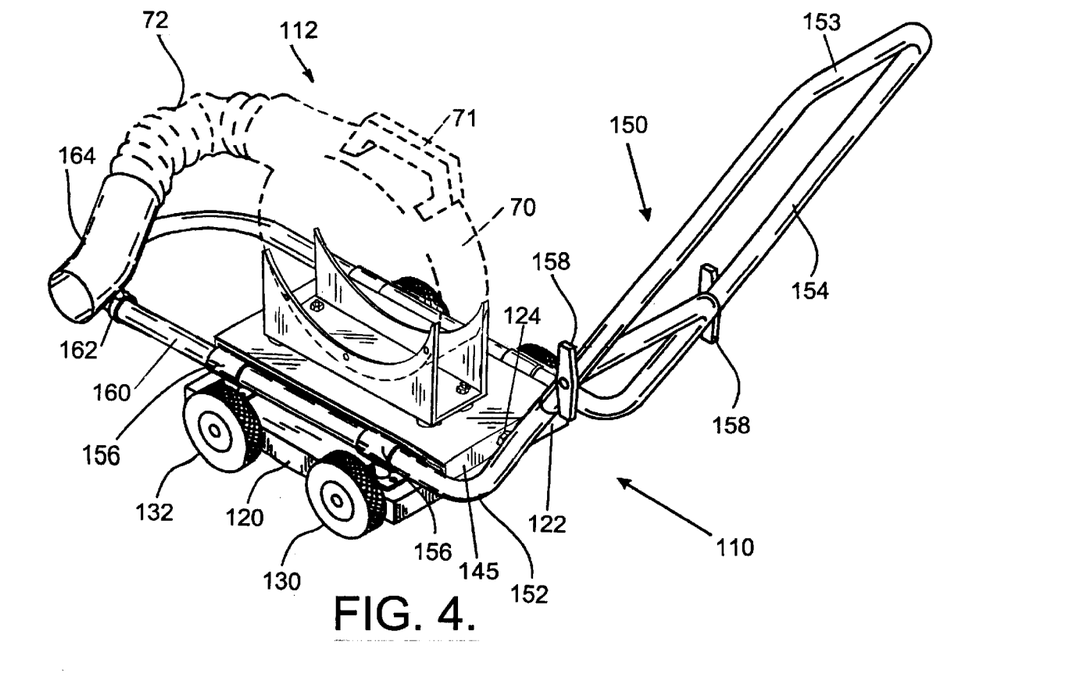
FIG. 4 is a perspective view of a second preferred embodiment of a utility cart according to the invention for supporting and transporting a landscaping appliance between locations where the landscaping appliance is to be used.

FIG. 4 is a perspective view of a second preferred embodiment of a utility cart, indicated generally at 110, for supporting and transporting a landscaping appliance, indicated generally at 112, between locations where the landscaping appliance is to be used. The landscaping appliance 112 may be any conventional lawn or garden tool, such as a hand-held leaf blower, garden caddy, wheelbarrow, dump bed, spreader or chemical dispenser. For purposes of illustration only, the landscaping appliance 112 indicated by the broken lines in FIG. 4 is a conventional hand-held leaf blower.

The utility cart 110 is easily and readily converted for use with a variety of landscaping appliances 112. In particular, the utility cart 110 is designed to support and transport a conventional hand-held leaf blower, garden caddy and dump bed, as well as a hand-held or backpack chemical dispenser and spreader, as will be described in greater detail hereinafter. In addition, the utility cart 110 is made of lightweight materials, such as aluminum or plastic, for maneuverability and to combat fatigue during use. Further still, the utility cart 110 is compact for convenient storage. The utility cart 110 comprises a generally rectangular base 120, a plurality of wheels 130, 132 rotatably mounted to the base or to an extension thereof and a handle 150 adjacent the rear of the base. Preferably, the utility cart 110 further comprises a mounting arm 160 adjacent the front of the base 120 for adjustably mounting an accessory of the landscaping appliance 112 to the base of the utility cart, as will be described hereinafter.

As best shown in FIG. 4, the base 120 of the utility cart 110 defines a generally planar platform 122 for supporting the landscaping appliance 112 thereon during transportation and use. Preferably, the platform 122 is formed of a rigid material, for example a cast or machined aluminum plate. As a result, the platform 122 tends to transfer vertical shocks and forces to the landscaping appliance 122 as it is transported over rough or uneven terrain. Accordingly, when the utility cart 110 is utilized to support and transport a hand-held leaf blower, auxiliary vibration isolators are desirable to protect the delicate electrical and mechanical components of the leaf blower and to diminish the amount of vibration transferred to the operator through the handle 150, and thereby further reduce the possibility of fatigue or injury. Suitable vibration isolators are described in greater detail hereinafter. However, the utility cart 110 need not be provided with vibration isolators of any kind, or may be provided with any other known means for absorbing vibration.

A plurality, and preferably four, wheels 130, 132 are rotatably mounted to the base 120 so that the utility cart 110 may be easily moved over uneven terrain. The wheels 130, 132 may be made of any suitable material, but preferably are made of hard plastic or vulcanized rubber. Preferably, a pair of rear wheels 130 are rotatably mounted adjacent the rear of the base 120 on short axles extending outwardly from opposite sides of the base in the plane of the platform 122. Preferably, a pair of front wheels 132 are rotatably mounted to the base 120 on opposite sides adjacent the front of the base in a like manner. As shown, the wheels 130, 132 are relatively small in diameter so that the landscaping appliance 112 is situated near the ground. However, the wheels 130, 132 may be any diameter and may be located anywhere on the utility cart 110 relative to the base 120 so long as the utility cart remains lightweight and compact.

Figure 5:
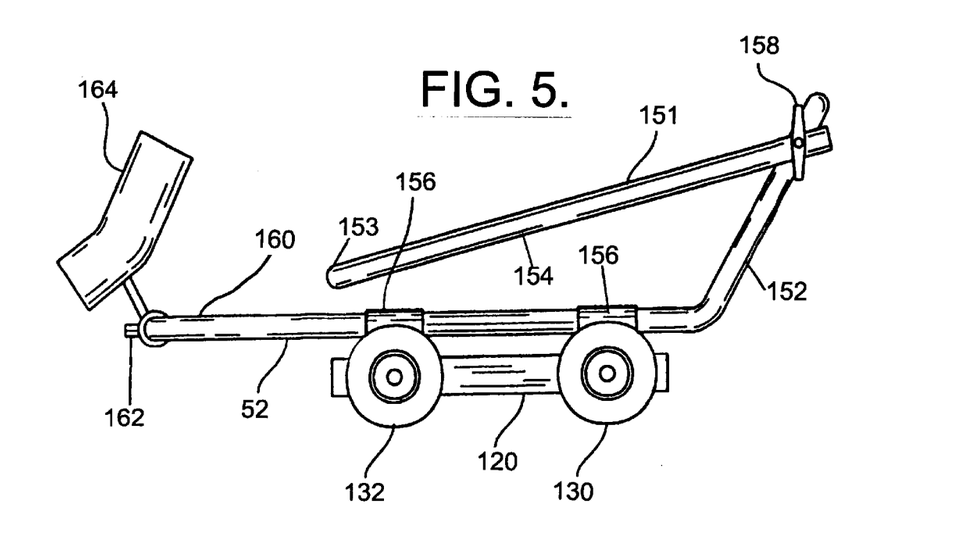
FIG. 5 is a side elevation view of the utility cart of FIG. 4 shown with the handle folded downwardly for convenient storage.

The utility cart 110 further comprises a handle 150 consisting of a lower portion 152 and an upper portion 154. The handle 150 may be made of any lightweight, formable material, but preferably is made of rigid, extruded aluminum or plastic tubing. The lower portion 152 is fixed to the base 120 of the utility cart 110, for example by welding or by inserting threaded bolts through the handle 150 and into tapped holes provided in the base. Preferably, however, the lower portion 152 is fixed to the base 120 of the utility cart 110 by a plurality of adjustable clamshell railing brackets 156 that encircle the handle and are attached to the upper surface of the base with metal fasteners or an adhesive. The upper portion 154 is generally U-shaped and comprises a pair of arms 151 (FIG. 5) depending downwardly from an uppermost grasping portion 153 (FIG. 4). The upper portion 154 extends rearwardly and upwardly from the base 120 of the utility cart 110 and is rotatably mounted to the lower portion 152 in a known manner. Thus, the upper portion 154 may be rotated and folded over the lower portion 152 as shown in FIG. 5 for convenient storage of the utility cart 110. Preferably, the arms 151 of the upper portion 154 of the handle 150 terminate in semi-circular ends that are rotatably secured to the lower portion 152 by a pair of handwheels 158. The handwheels 158 can be tightened to hold the upper portion 154 in an upright position and subsequently loosened to permit the upper portion to fold downwardly over the lower portion 152, as previously described. Alternatively, the upper portion 154 of the handle 150 may be separated from the remainder of the utility cart 110 for convenient storage when not in use.

The utility cart 110 may further comprise a generally U-shaped mounting arm 160 for mounting a discharge chute 164 adjacent the base 120 of the utility cart 110. Preferably, the mounting arm 160 is integrally formed with the lower portion 152 of the handle 150, and thus is secured to the base 120 of the utility cart 110 by the pair of clamshell railing brackets 156. The mounting arm 160 comprises means 162 for adjustably mounting the discharge chute 164 at a predetermined location and in a predetermined orientation on the mounting arm. In a preferred embodiment, the adjustable mounting means 162 is a clamp that can be tightened and loosened to alternatively engage and disengage, respectively, the mounting arm 160 and the discharge chute 164 is secured to the free end of the clamp in any known manner. Thus, the discharge chute 164 may be readily positioned at any predetermined location on the mounting arm 160 through an angle of about 180 degrees relative to the base 120 of the utility cart 110. Additionally, the discharge chute 164 may be readily pivoted through an angle of about 45 degrees about an axis in the plane of the platform 122 of the base 120. Accordingly, the inclination and direction of the air stream from a conventional leaf blower can be adjusted relative to the direction of travel of the utility cart 110.

Figure 6:
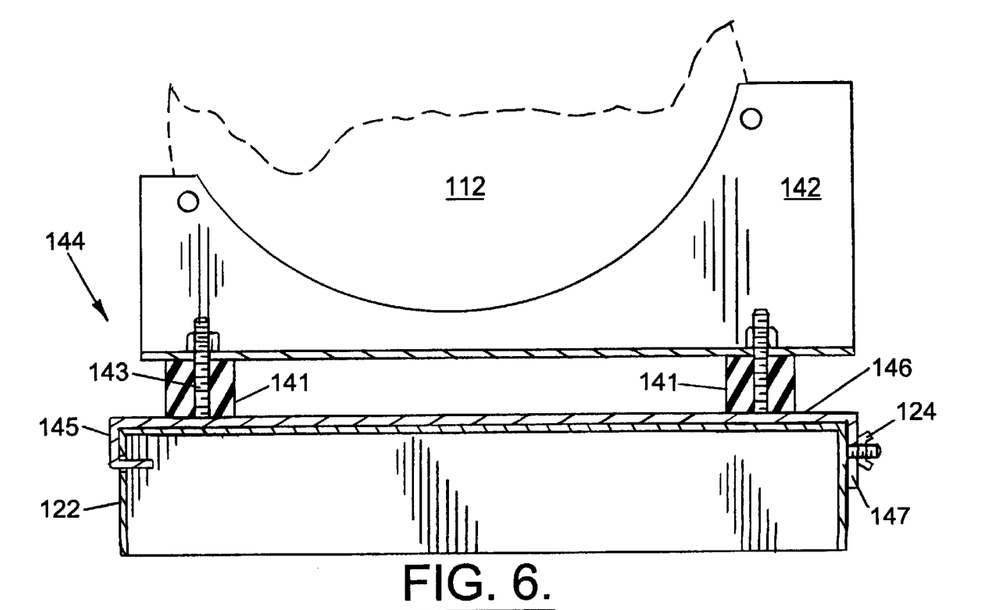
FIG. 6 is a longitudinal cross section of a preferred mounting bracket and means for temporarily securing a conventional hand-held leaf blower to the base of the utility cart of FIG. 4.
Figure 7:
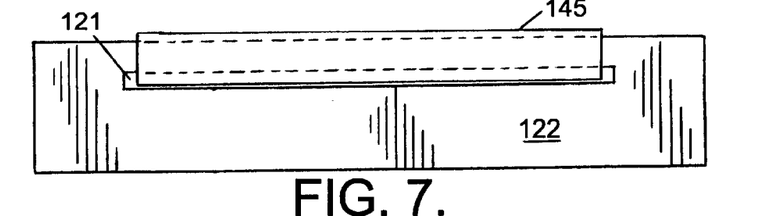
FIG. 7 is a left-hand end view of the preferred mounting bracket and temporary securing means of FIG. 6.
Figure 8:
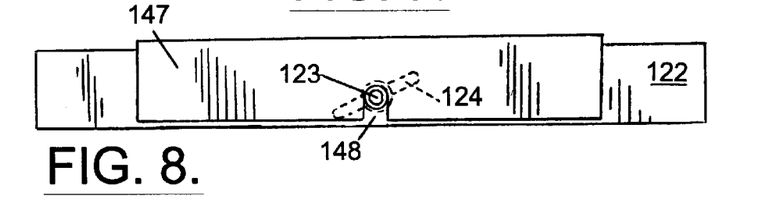
FIG. 8 is a right-hand end view of the preferred mounting bracket and temporary securing means of FIG. 6.

As shown in FIGS. 6–8, the platform 122 defined by the base 120 of the utility cart 110 comprises means 144 for temporarily securing the landscaping appliance 112 thereon. Preferably, the temporary securing means 144 comprises an elongate slot 121 (FIG. 7) formed in one end of the platform 122 and an internally threaded hole 123 (FIG. 8) provided in the opposite end of the platform. The hole 123 engages an externally threaded thumbscrew 124 (FIG. 6) for a purpose to be described hereinafter. The landscaping appliance 112 is provided with a mounting bracket 146 for cooperating with the temporary securing means 144. The mounting bracket 146 may be integrally formed with the landscaping appliance 112 or may be removably attached thereto. Thus, the landscaping appliance, for example a hand-held leaf blower or hand-held or backpack spreader, can be utilized separately from the mounting bracket 146 and the utility cart 110. Preferably, the mounting bracket 146 of the landscaping appliance 112 comprises a U-shaped flange 145 at one end and an L-shaped flange 147 at the opposite end having a recess 148 (FIG. 8) formed therein. The flange 145 engages the slot 121 of the platform 122 and the recess 148 permits the head of the thumbscrew 124 to engage the flange 147, thereby temporarily securing the landscaping appliance 112 to the base 120 of the utility cart 110.

The mounting bracket 146 may further comprise a plurality of vibration isolators 141 for absorbing vertical shocks and forces so that the landscaping appliance 112 is cushioned as it is transported over rough or uneven terrain. When the utility cart 110 is utilized to support and transport a hand-held leaf blower, the vibration isolators 141 serene to protect the delicate electrical and mechanical components of the leaf blower. More importantly, the vibrations isolators 141 diminish the amount of vibration transferred to the operator through the base 120 and the handle 150 of the utility cart 110, and thereby further reduce the possibility of fatigue or injury. The vibration isolators 141 may be made of any soft, energy-absorbing material. Preferably, however, the vibration isolators 141 are made of a natural or synthetic rubber, or soft polyvinylchloride (PVC) material. As shown in FIG. 6, the vibration isolators 141 may be positioned between a lower portion and an upper portion of the mounting bracket 146. The lower and upper portions of the mounting bracket 146 are preferably formed of thin sheet metal and the upper portion comprises a vertical flange 142 that conforms to the contour of the housing of the hand-held leaf blower and is removably attached thereto with conventional fasteners. The lower portion of the mounting bracket 146 preferably has a plurality of threaded studs, or posts 143 extending upwardly therefrom and through the plurality of vibration isolators 141. The upper portion of the mounting bracket 146 has a corresponding plurality of holes formed therethrough for receiving the posts 143 and fasteners 149 to secure the lower portion of the mounting bracket, the vibrations isolators 141 and the upper portion of the mounting bracket together.

As illustrated in FIG. 4, the utility cart 110 is particularly well suited for supporting and transporting a conventional hand-held leaf blower 70. The leaf blower 70 is positioned on the platform 122 of the base 120 and the mounting bracket 146 is manipulated such that the flange 145 engages the slot 121 and the flange 147 cooperates with the thumbscrew 124 as previously described. The thumbscrew 124 is then tightened until the leaf blower 70 is secured by the means 144 for temporarily securing the landscaping appliance 112 to the utility cart 110. The rigid exhaust chute of the leaf blower 70 is replaced by a flexible conduit 72 so that the exhaust outlet of the leaf blower is in fluid communication with the discharge chute 164 on the mounting arm 160. The adjustment means 162 is then utilized to position the discharge chute 164 on the mounting arm 160 in the predetermined location and orientation relative to the exhaust outlet of the leaf blower 70. The flexible conduit 72 may be removably connected to the discharge chute 164 at one end and to the exhaust outlet of the leaf blower 70 at the other end in a known manner by a hose clamp (not shown) having a thumbscrew or other convenient means for rapidly connecting and removing the flexible conduit. In this preferred embodiment, the utility cart 110 supports and transports the leaf blower 70 so that the user can operate the leaf blower over a large area or for an extended period of time without tiring.

Figure 9:
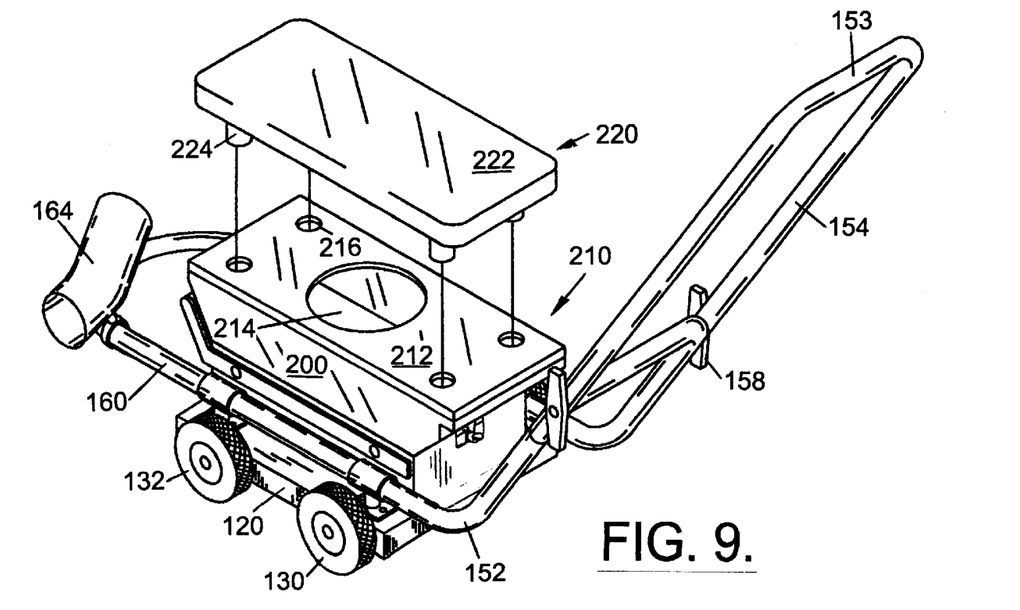
FIG. 9 is a perspective view of the utility cart of FIG. 4 supporting a conventional dump bed, chemical dispenser receiving means and garden caddy seat thereon.
Figure 10:
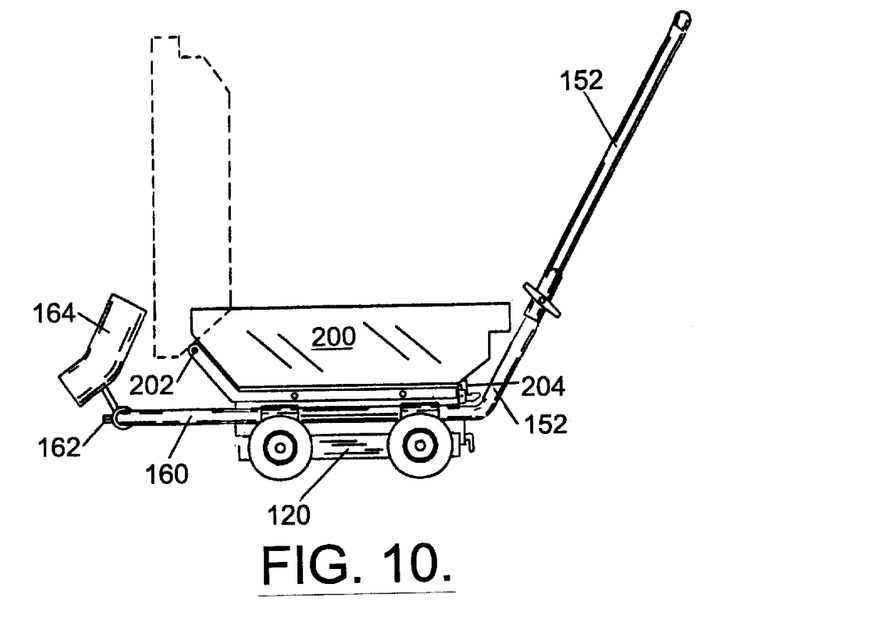
FIG. 10 is a side elevation view of the utility cart of FIG. 9 illustrating the dump bed in the fill position, indicated by the solid lines, and in the dump position, indicated by the broken lines.

As illustrated in FIG. 9, the utility cart 110 is also particularly well suited for supporting and transporting a conventional dump bed 200, a means 210 for receiving a chemical dispenser and the seat 222 of a garden caddy 220. The base of the dump bed 200 is provided with the lower portion of the mounting bracket 146 and is secured to the platform 122 defined by the base 120 of the utility cart 110 in the manner previously described. The dump bed 200 further comprises a transverse pivot axis 202 (FIG. 10) and a release latch 204 (FIG. 10) for permitting the dump bed to be rotated about the pivot axis. As shown in FIG. 10, the dump bed 200 is movable between a fill position, indicated by the solid lines, and a dump position, indicated by the broken lines. The chemical dispenser receiving means 210 comprises a generally planar platform 212 configured to cooperate with the upper edge of the dump bed 200. The platform 212 has a cylindrical hole 214 formed therethrough to receive a chemical dispenser 215 (FIG. 11), such as a liquid fertilizer bottle, for delivering a chemical mixture to vegetation.

Figure 11:
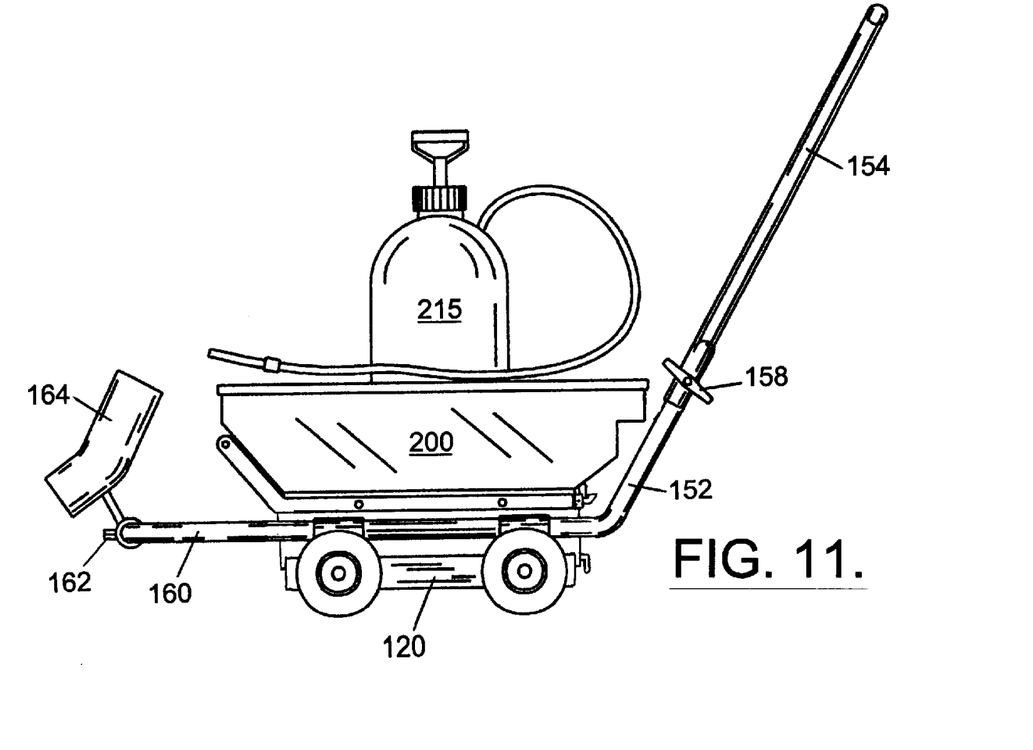
FIG. 11 is a side elevation view of the utility cart of FIG. 4 supporting a conventional hand-held or backpack spreader thereon.

As illustrated in FIG. 11, the chemical dispenser 215 is positioned within the dump bed 200 through the cylindrical hole 214 such that the dump bed and the platform 212 support the chemical dispenser in an upright orientation. The platform 212 also has a plurality of smaller diameter holes 216 (FIG. 9) formed therethrough for engaging a corresponding plurality of feet 224 extending outwardly from the bottom surface of the seat 222 of the garden caddy 220. The seat 222 is positioned on the platform 212 with the feet 224 engaging the holes 216 such that the seat is supported by the dump bed 200 and the chemical dispenser receiving means 210. The seat 222 of the garden caddy 220 and the platform 212 of the chemical dispenser receiving means 210 can be easily and readily removed to expose the interior storage compartment of the garden caddy defined by the hollow dump bed 200. Accordingly, the utility cart 110 supports and transports the garden caddy 220 so that the user can work comfortably for extended periods of time in a flowerbed or garden near to the ground.

Figure 12:
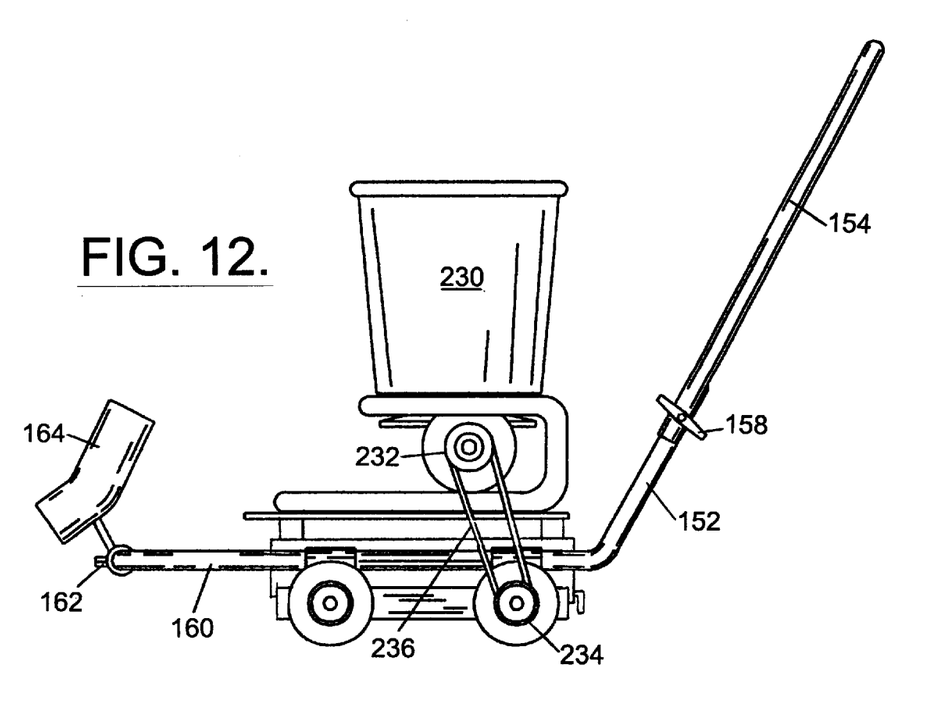
FIG. 12 is a side elevation view of the utility cart of FIG. 9 supporting a conventional hand-held or backpack chemical dispenser thereon.

As illustrated in FIG. 12, the utility cart 110 is also particularly well suited for supporting and transporting a conventional spreader 230. Preferably, the spreader 230 is provided with the lower portion of the mounting bracket 146 and is secured to the platform 122 defined by the base 120 of the utility cart 110 in the manner previously described. Alternatively, the spreader 230 may be provided with a pattern of holes corresponding to the plurality of posts 143 of the temporary securing means 144. The lower portion of the mounting bracket 146, the vibration isolators 141 and the spreader 230 can then be secured together as previously described to diminish the vibrations transferred from the base of the utility cart 110 to the spreader. Preferably, the hand crank of the spreader 230 is removed and replaced with an outwardly extending shaft comprising a pulley 232. Similarly, one of the plurality of wheels 130, 132 is fitted with an outwardly extending shaft comprising a pulley 234 for turning the pulley 232 with a belt 236 in a known manner. Accordingly, the spreader 230 is activated when the utility cart 110 is propelled over the surface of the ground.

From the forgoing, it is readily apparent that the invention provides a versatile, lightweight and compact utility cart for supporting and transporting a variety of landscaping appliances. In particular, the utility cart can be easily and readily converted from a utility cart for supporting and transporting a conventional hand-held leaf blower to a utility cart for supporting and transporting a conventional garden caddy. Because the utility cart is lightweight, it is easy to maneuver and combats fatigue during use. Because the utility cart is compact, it is convenient to store.

It is to be understood that the forgoing description and specific embodiments shown herein are merely illustrative of the best mode of the invention and the principals thereof, and that various modifications and additions may be made to the apparatus by those skilled in the art without departing from the spirit and scope of the invention, which is intended to be limited only by the scope of the appended claims.

That which is claimed is:

1. A versatile utility cart for supporting and transporting a variety of landscaping appliances, said utility cart comprising a base defining a generally planar platform for supporting the landscaping appliance;

a plurality of wheels rotatably mounted to said base for transporting the landscaping appliance;

a generally U-shaped mounting arm adjacent said base for mounting an accessory of the landscaping appliance on the utility cart, said mounting arm comprising a clamp for adjustably mounting the accessory of the landscaping appliance on said mounting arm, wherein said clamp can be tightened and loosened to alternatively engage and disengage, respectively, said mounting arm to position the accessory at a predetermined location and orientation relative to said base; and means for temporarily securing the landscaping appliance on said platform of said base, said securing means comprising an elongate slot formed in a first end of said platform;

a mounting bracket connected to the landscaping appliance, said mounting bracket comprising a U-shaped flange adjacent a first end of said mounting bracket for engaging said slot formed in said platform and an L-shaped flange adjacent a second end of said mounting bracket;

an internally threaded hole formed in a second end of said platform; and an externally threaded thumbscrew for engaging said hole formed in said platform;

wherein said L-shaped flange of said mounting bracket has a recess formed therein for cooperating with said hole formed in said second end of said platform and said thumbscrew to temporarily secure the landscaping appliance to the utility cart.

2. A versatile utility cart according to claim 1 wherein said mounting bracket further comprises a vertical flange for removably attaching the landscaping appliance to said mounting bracket.

3. A versatile utility cart according to claim 1 wherein said mounting bracket of said securing means further comprises a lower portion having a plurality of threaded posts extending outwardly therefrom;

an upper portion having a corresponding plurality of holes formed therethrough for receiving said plurality of posts therein; and a corresponding plurality of vibration isolators positioned about said plurality of posts and between said lower portion and said upper portion of said mounting bracket.

4. A versatile utility cart according to claim 1 further comprising a generally U-shaped handle comprising a distal grasping portion and a pair of arms spaced apart by said grasping portion and rigidly fixed to said base.

5. A versatile utility cart according to claim 4 wherein said handle comprises an upper portion adjacent said grasping portion and a lower portion adjacent said base and wherein said upper portion of said handle is rotatably mounted to said lower portion of said handle to permit said upper portion to be folded downwardly over said lower portion for convenient storage.

6. A versatile utility cart according to claim 1 further comprising a chute secured to the free end of said clamp.

* * * * *